United States Patent [19]

Thompson et al.

[11] Patent Number: 4,637,248

[45] Date of Patent: Jan. 20, 1987

[54] ADAPTIVE DISPLACEMENT SENSOR FOR CONTOUR MACHINING

[75] Inventors: Robert A. Thompson, Quaker Street; Robert S. White, Scotia, both of N.Y.

[73] Assignee: General Electric Company, Schenectady, N.Y.

[21] Appl. No.: 783,894

[22] Filed: Oct. 3, 1985

[51] Int. Cl.[4] ............................................. G01B 13/12
[52] U.S. Cl. ..................................... 73/37.5; 364/474
[58] Field of Search ................. 73/37.5, 37.6; 364/474

[56] References Cited

U.S. PATENT DOCUMENTS

| 3,446,058 | 5/1969 | May ...................................... 73/37.5 |
| 3,523,447 | 8/1970 | Sharp et al. ........................... 73/37.5 |
| 3,577,642 | 5/1971 | Tripoli et al. ..................... 73/37.5 X |
| 3,889,520 | 6/1975 | Stöferle et al. ....................... 73/37.5 |
| 4,270,382 | 6/1981 | Kamman ............................... 73/37.5 |

FOREIGN PATENT DOCUMENTS 179006 3/1964 U.S.S.R. ................................ 73/37.5

Primary Examiner—Stewart J. Levy
Assistant Examiner—Joseph W. Roskos
Attorney, Agent, or Firm—Donald R. Campbell; James C. Davis, Jr.; Paul R. Webb, II

[57] ABSTRACT

A rotating displacement sensor located on the tool holder under the cutting tip works equally well in many directions so it can perform in-process and tool condition compensation of contoured parts. The air nozzle is rotated by a turret-mounted motor and has a rectangular displacement sensing orifice whose plane is kept parallel to machined surfaces. An automatic control continuously adjusts the nozzle rotation to minimize the air gage output voltage and measured distance from the nozzle to the workpiece. The device may be used strictly as an inspection head.

14 Claims, 12 Drawing Figures

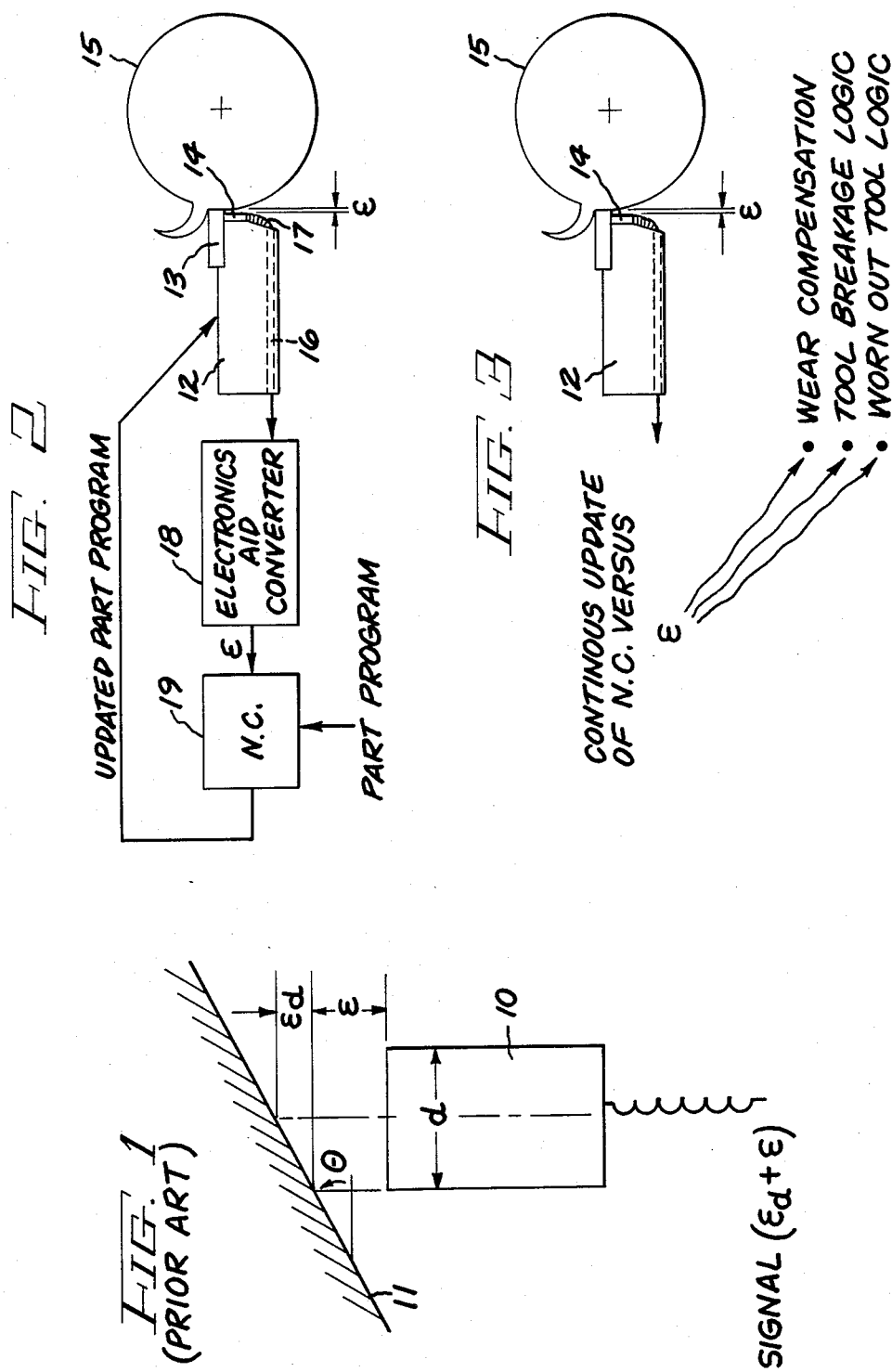

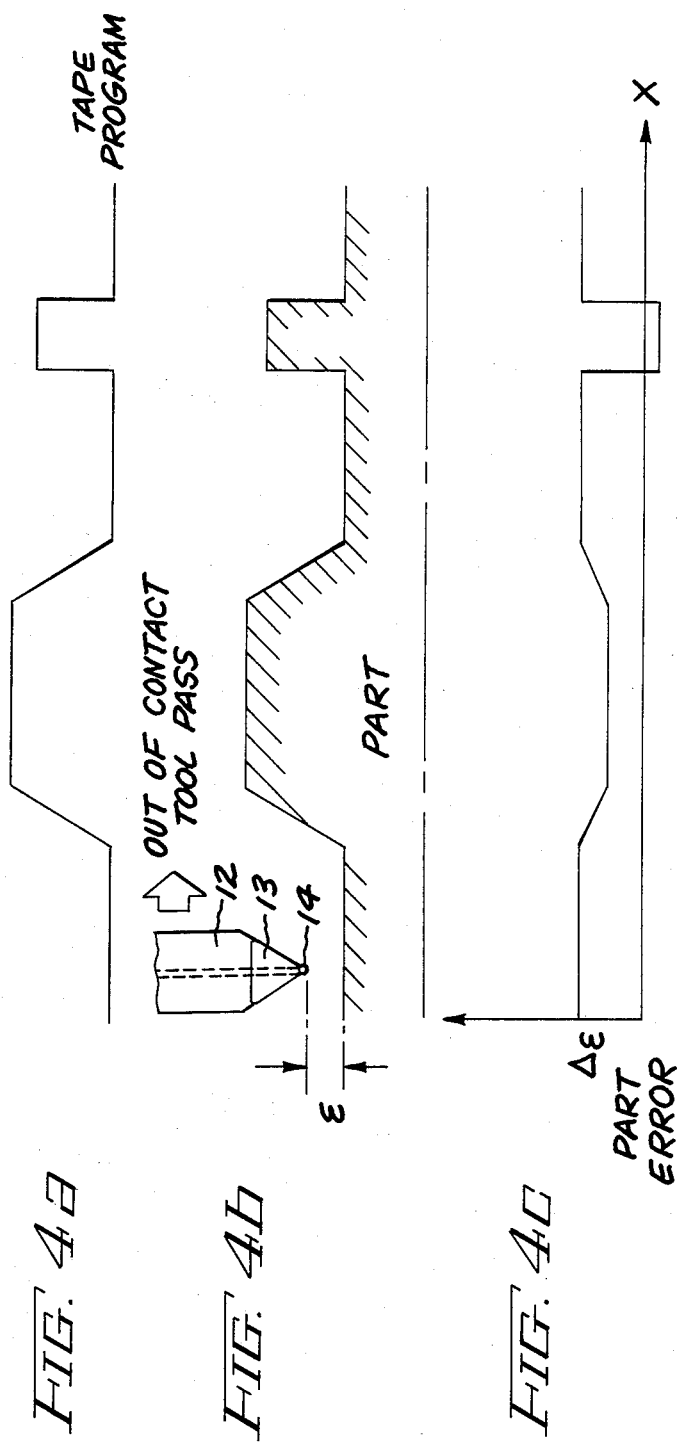

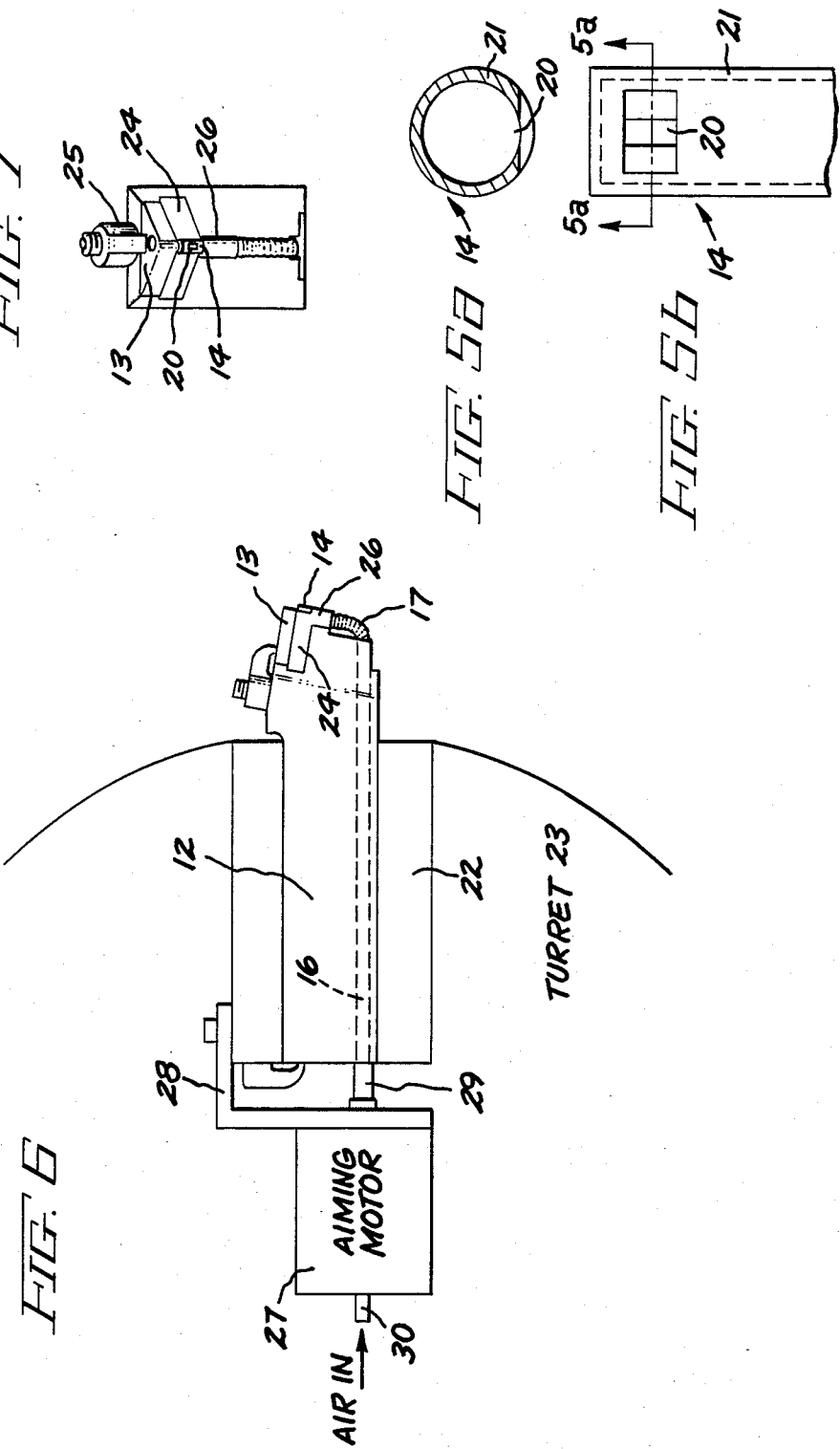

ADAPTIVE DISPLACEMENT SENSOR FOR CONTOUR MACHINING

BACKGROUND OF THE INVENTION

This invention relates to an improved gage and system for in-process inspection of contoured parts and automated cutting tool condition compensation during the machining operation.

Two very important manufacturing problems are addressed by in-process inspection of machined workpieces and tool condition compensation, i.e. monitoring the cutting tool during the machining process and compensating for tool wear and breakage. First, part inspection on a separate gaging machine followed by rework is both costly and a source of errors during set-up for remachining. These could be eliminated if the part could be inspected on the machine where it is initially turned. Second, there is a need for in-process compensation of tool wear and prompt detection of worn tools and broken tools. Breakage, for example, must be sensed and the tool withdrawn before there is part damage.

Copending allowed application Ser. No. 580,316 filed Feb. 15, 1984, R. A. Thompson and R. E. Breuning, a continuation-in-part of Ser. No. 304,495 filed Sept. 22, 1981 and now abandoned, describes a method for dealing with these problems. A stationary, unidirectional, passive air gage displacement sensor is used, and therefore the method applied only to straight cuts. A similar solution is also needed for contoured cuts, but it cannot be met by such a sensor whose nozzle is mounted on and is stationary relative to the tool holder. FIG. 1 illustrates the primary difficulty which arises when inspecting a contoured surface with a stationary sensing head. If the probe has a spherical head, it is insensitive to the direction to the target. However, like most probes air gages have flat heads. As such a stationary air gage does not have sufficient range to handle the contouring problem.

SUMMARY OF THE INVENTION

An object of the invention is to provide an improved tool-mounted displacement sensor which performs equally well in all directions and accurately measures the distance to contoured workpiece surfaces.

Another object is the provision of such a gaging device for in-process inspection of tapered cuts and facing cuts as well as straight cuts.

Yet another object is to provide a rotating displacement sensor mounted under the tool tip which performs in-process inspection and tool condition compensation of contoured parts.

The adaptive displacement sensing system according to an illustrative embodiment is featured by a rotating nozzle that has a rectangular slit orifice and is supported on the tool holder under the cutting tip of the cutting insert. Means are provided to rotate the nearly vertical air nozzle about its axis so that the plane of the displacement sensing orifice is kept parallel to machined contoured workpiece surfaces during the machining operation. There are means to supply air to the rotatable nozzle and for sensing back pressure and for generating an output voltage representing distance from the nozzle to the workpiece surface.

The air nozzle is typically a closed-end tube having the slit orifice in the side wall. A horizontal hollow drive shaft is supported in the tool holder; a flexible bellows transmits shaft rotation around a bend to the nozzle and serves to direct pressurized air to it. This drive arrangement permits the motor drive to be located at the rear of the tool and permits air admission at the rear. The aiming motor to adjust the nozzle is preferably a part of the turret system which supports the tool block and receives the tool holder. An automatic motor control continuously adjusts the nozzle rotation to minimize the air gage output voltage and consequently the measured distance.

The device may be used solely as an inspection head. The cutting insert is eliminated and the nozzle moved up onto the centerline of the lathe or other machine tool.

BRIEF DESCRIPTION OF THE DRAWINGS

FIG. 1 shows a prior art stationary air gage inspecting a contoured surface.

FIG. 2 is a sketch and block diagram of the improved in-process inspection and tool condition compensation system using a rotating displacement sensor.

FIG. 3 illustrates the tool condition monitor functions of the system.

FIG. 4a–4c relate to in-process inspection uses and illustrate the part program, an out of contact inspection pass, and the part error.

FIGS. 5a and 5b are cross-sectional and front views of the rotating nozzle.

FIG. 6 shows one tool block position on a rotatable turret which is modified to have a nozzle aiming drive, and a side view of the tool holder that has a rotating air nozzle under the tool tip.

FIG. 7 is an end view of the tool holder, triangular cutting insert, and tool-mounted rotating nozzle.

DETAILED DESCRIPTION OF THE INVENTION

Figure 8:
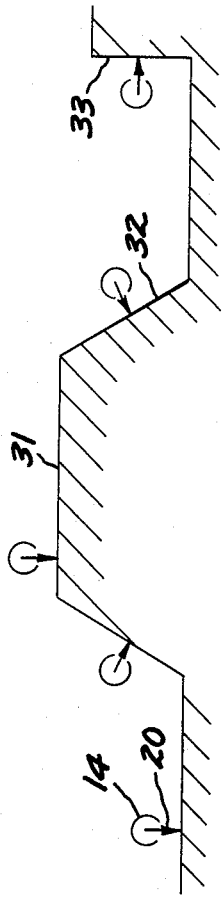
FIG. 8 illustrates rotation of the nozzle so that the exiting air stream is normal to straight cuts, taper cuts and facing cuts on a workpiece.

FIG. 1 shows a non-rotatable, flat-headed probe 10 inspecting the tapered surface 11. The probe has a directional offset $\epsilon_d$ when it is not normal to the gaged surface. If the maximum range of the probe is anywhere less than $\epsilon_d$, the probe cannot inspect the entire contour. Since the probe measures the average distance to the target, it is clear from the figure that $$\epsilon_d = (d/2) \tan \theta \tag{1}$$

where d is the orifice diameter and $\theta$ is the taper angle. Equation (1) can be rearranged and written in terms of the range-to-diameter ratio of the probe, or $$\text{Range-to-diameter ratio} = \epsilon_d/d = 0.5 \tan\theta \tag{2}$$

If the gage is to cover the full 90° contouring range, the maximum angle must be $\theta$ must be ±45° and, according to equation (2), the range-to-diameter ratio of the probe must be $\epsilon_d/d = 0.5$; but to give the sensor some useful working range, the actual value must be greater than 0.5. Of existing displacement gages, such as magnetic, optical, etc., the air gage has the best range-to-diameter ratio, its value for a circular orifice being $$\epsilon_{max}/d = 0.25 \tag{3}$$

It is clear by comparing equations (2) and (3) that a stationary air gage does not have sufficient range to handle the contouring problem. Therefore, another approach, the rotating nozzle must be considered. First the principles of in-process tool condition monitoring and inspection using the same distance measuring gage for both functions are reviewed.

FIG. 2 shows the basic control loop for the tool mounted displacement probe in-process inspection and tool condition compensation system. Only those components of a conventional numerically controlled lathe that are needed to understand the invention are illustrated. The tool holder 12 and removable insert 13 are modified to have, beneath the cutting tip, a nearly vertical rotatable air nozzle 14 which directs an air stream normal to the freshly machined surface of workpiece 15. Air is supplied to nozzle 14 and it is rotated about its axis by a hollow drive shaft 16 and flexible bellows 17. Since the nozzle is nearly vertical while its drive shaft 16 is horizontal, the bellows 17 serves to bend the rotation from the horizontal to near vertical. The displacement signal representing the distance $\epsilon$ from the air nozzle 14 to the workpiece surface is fed into the probe electronics and analog-to-digital converter 18. The analog voltage is converted into a digital indication of probe gap after which it is sent to the numerical control 19 where a control strategy is executed and modified part program commands are fed back to the tool position drives. The N.C. is typically a General Electric 1050T numerical control; automatic in-process tool wear compensation and inspection are controlled by software using the M-codes. Refer to co-pending application Ser. No. 580,316 for more detail.

During a chip forming operation, the tool mounted displacement probe is used as a tool condition monitor as shown in FIG. 3. As the tool wears, it is clear that $\epsilon$ decreases an amount equal to the wear. This can be fed to the numerical control which offsets the tool position to compensate for the wear. If the tool breaks, $\epsilon$ changes abruptly. Software can interpret this change as breakage and shut the machine down. It can also respond when $\epsilon$ reaches a preset minimum value indicating that the tool is worn out.

The second use of the tool mounted displacement probe, illustrated in FIGS. 4a-4c, is the part inspection mode. It is important because when a part program directs the path of the tool during a cutting operation, the control has no way of knowing and therefore cannot compensate for deflections in the machining system due to cutting forces, wear, etc. Therefore, for example, as the tool wears and the cutting forces increase, the work is forced away from the tool and the actual depth of cut is less than the programmed depth by the combined effect of the wear itself and the wear induced force increase. This same effect arises in thin walled or long slender work pieces which are subject to deflection during a cutting pass, and since the deflections are not compensated, they result in part errors. To evaluate this error, the tool is pulled a few mils out of contact with the part so as to eliminate the cutting forces. The taped program is then run while monitoring $\epsilon$. If $\epsilon$ remains constant during this pass it indicates that the part is identical to the program and no corrective action is needed. But if $\epsilon$ varies, the variation indicates the difference between the part and the program. This difference can be fed into the numerical control on a block-by-block basis, and the modified part program can be rerun. Through interactive inspect-rework cycles, the part can be brought into tolerance without the intervention of an operator.

The rotating air nozzle 14 is shown enlarged in FIGS. 5a and 5b. The displacement sensing orifice is a rectangular slit 20 cut into the side wall of a closed-end cylindrical tube 21. Air or another suitable fluid is discharged from the orifice onto the workpiece surface, and the nozzle is rotated about its longitudinal axis to keep the air stream normal to contoured surfaces. The back pressure in the sensing head is measured remotely by an air gage where it is converted into a displacement signal. The use of a rectangular slit as opposed to a circular orifice essentially doubles the range-to-diameter ratio of the sensor and is narrow, thereby reducing time lags in the sensor's response. The slit also adapts itself well to the circular shape of the sensing head.

Equation (3) gives the best range-to-diameter ratio for a circular orifice. Considering a nozzle with a rectangular exit, the term range-to-diameter ratio is replaced by range-to-side ratio. Where the rectangle has a base B and height H, it can be shown that $$\epsilon_{max}(B+H)/BH = 0.5 \tag{4}$$

If H is much greater than B, it dominates the term (B+H) in the numerator and the range-to-side ratio of a slender rectangle becomes $$\epsilon_{max}/B \approx 0.5 \tag{5}$$

This represents a doubling of the range-to-side ratio; the effective range of the air gage is doubled. Elliptically shaped and triangular nozzles do not give as good a result as the rectangle.

FIG. 6 shows one tool block position on the vertical turret of the machine tool. Tool holder 12 mounts onto the tool block 22 on turret 23. Looking also at FIG. 7, the triangular cutting insert 13 is secured at the front of the tool to the seat plate 24 and held down from the top by a clamp 25. A nozzle bearing 26 extends from the point of triangular seat plate 24 and may be formed integral with the seat plate. In this way the rotating nozzle 14 is mounted on the tool holder so as to be directly under the tool tip. To accommodate the nozzle bearing 26, it is necessary to angle the nozzle 14 off the vertical by a small angle. As the nozzle rotates the plane of rectangular orifice 20 is kept parallel to contoured workpiece surfaces during a machining operation. The radius of curvature of the nozzle is the same as the radius of curvature of the tool tip and its axis is preferably colinear with the axis of the tip. Therefore, the nozzle bears the same relation to the tip, regardless of the way it is aimed.

If the device is to be used strictly as an inspection head, i.e. operate at a dedicated turret location in the absence of cutting, the insert 13 shown in the figure would be eliminated, and the nozzle 14 moved into a vertical orientation up onto the centerline of the lathe axis. Such an inspection head is relatively insensitive to part diameter.

Other unique features of the invention include the method by which air is supplied and the rotating nozzle turned. Since the nozzle 14 is nearly vertical while its drive shaft 16 is horizontal, it is necessary that the rotation be bent from the horizontal to near vertical. This is achieved by the flexible bellows 17, which further serves to direct the air to the nozzle. This nozzle drive arrangement permits the motor drive to be located out of the way at the rear of the tool. It further permits air admission at the rear of the tool. A turret-mounted aiming motor 27 is fastened by a bracket 28 to the side of tool block 22. A coupling hose 29 transmits motor shaft rotation to drive shaft 16. Inlet air is passed through tube 30 at the rear of the motor to the motor shaft, which is hollow.

FIG. 8 is a diagram of a contoured turned part which is machined by making straight cuts, taper cuts, and facing cuts 31–33. Rotating nozzle 14 is adjusted and pointed so that the rectangular slit orifice 20 always looks at the freshly machined workpiece surface. The airstream depicted by the arrow is kept normal to the contoured surface during the machining of all of these types of cuts. It will be understood that every tool has a certain range and no single tool can make all of the cuts shown in FIG. 8. The equilateral tool in FIG. 7, for example, makes straight cuts and taper cuts of up to 60° of either inclination. The rotating nozzle on such a tool is rotatable through up to 120°.

Figure 9:
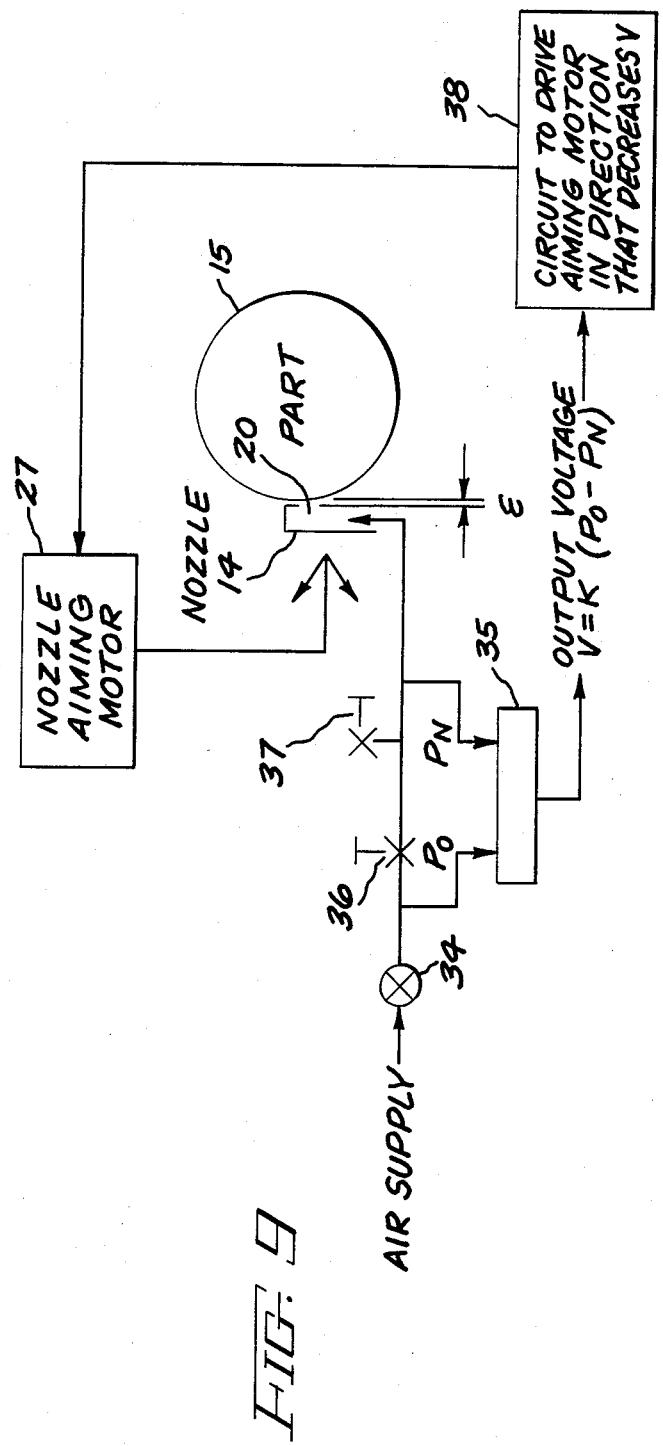
FIG. 9 is a line diagram of a distance measuring air gage modified to send its output signal to circuitry to adjust the nozzle position.

The nozzle aiming motor 27 is controlled preferably by an automatic control which continuously adjusts the nozzle rotation to minimize the air gage signal and thus the measured distance from the nozzle to the workpiece surface. The air stream is then always normal to the contoured surface. The air gage in FIG. 9 is a modification of the Trendsetter ® unit sold by Edmunds Gage Company of Farmington, CT. Line air is supplied to a fixed pressure regulator 34; its output is air at a fixed pressure which is the reference pressure $P_o$ at one input of a differential pressure transducer chip 35. The fixed pressure air is fed to a valve 36 which is an adjustable restriction and controls the gain. Valve 37 is an adjustable bleed and changes the set point of the air going to nozzle 14. The gage is set up to operate in the range where there is a linear relationship between the nozzle pressure $P_N$ and measured distance $\epsilon$, and the reference pressure $P_o$ is at about the middle of this range. The nozzle back pressure $P_N$ is high when $\epsilon$ is small and decreases linearly as $\epsilon$ increases. The output voltage V generated by differential pressure chip 35 is proportional to $P_o - P_N$. The gage output voltage is presented to a circuit 38, such as one containing a peak detector, to drive the aiming motor in the direction that decreases V. The rotating nozzle 14 is caused to oscillate back and forth until the measured gap and output voltage are at a minimum. This air gage displacement sensor does what prior air gages have done plus it finds the direction of machining.

Although the drawings illustrate the invention adapted to a triangular cutting insert, with suitable modification it could be applied to all types of cutting inserts including rounds, squares, diamonds, etc.

While the invention has been particularly described and shown with reference to preferred embodiments thereof, it will be understood by those skilled in the art that the foregoing and other changes in the form and details may be made without departing from the spirit and scope of the invention.

What is claimed is:

1. An adaptive displacement sensing system for in-process tool condition monitoring and inspection of contoured workpieces on a machine tool comprising:
   a tool having a cutting tip beneath which is supported a rotating nozzle that has a rectangular displacement sensing orifice;
   means to rotate said nozzle so that the plane of said rectangular orifice is kept parallel to machined contoured workpiece surfaces during a machining operation; and
   means to supply fluid to said rotating nozzle and for sensing fluid back pressure and generating an output signal representing distance from said nozzle to said workpiece surface.

2. The system of claim 1 wherein said rotating nozzle is a closed-end tube having said rectangular orifice in one side wall, and said orifice is long compared to its width to result in increased sensor range.

3. The system of claim 2 wherein said means to rotate said nozzle is comprised of an electric motor coupled by a hollow drive shaft and bellows to said nozzle which also serves to direct the fluid to said nozzle.

4. The system of claim 1 wherein said means to rotate said nozzle has an automatic control to minimize said output signal and consequently sensed distance.

5. In a machine tool including a turret-mounted tool block that receives a tool holder on which is mounted a removable insert having a cutting tip and a displacement sensor to gage the distance to a freshly cut machined surface, the improvement wherein said sensor is a rotating displacement sensor to accurately measure distances to contoured workpiece surfaces and comprises:
   a rotating air nozzle on said tool holder beneath said cutting tip which has a rectangular slit orifice to direct an air stream onto the workpiece;
   means mounted on said turret and on said tool holder to supply air to said nozzle and rotate said nozzle to keep the air stream normal to the contoured workpiece surfaces; and
   means to sense nozzle back pressure and generate an output voltage proportional to measured distance.

6. The improvement of claim 5 wherein said rotating nozzle is a closed-end cylindrical tube having said orifice cut into the tube side wall.

7. The improvement of claim 6 wherein said cutting tip has a given radius of curvature and the radius of curvature of said nozzle is the same.

8. The improvement of claim 5 wherein said turret-mounted means includes an aiming motor and said holder-mounted means includes a bellows connected to said nozzle, which is nearly vertical, and to a horizontal hollow shaft rotated by said motor and through which air is passed.

9. The improvement of claim 5 wherein said means to rotate said nozzle is a turret-mounted aiming motor, and means for controlling said motor so that said output voltage and measured distance are minimized.

10. An adaptive displacement sensing system for inspecting contoured turned parts on a machine tool comprising:
   a tool holder on which is supported a nearly vertical rotating nozzle that has a rectangular slit orifice;
   a substantially horizontal hollow drive shaft in said tool holder, and means to transmit shaft rotation around a bend to said nozzle and to supply air through said hollow shaft to said nozzle;
   motor means to rotate said drive shaft and nozzle so as to keep the plane of said slit orifice parallel to contoured workpiece surfaces being inspected; and
   gage means to sense nozzle and reference air pressures and generate an output voltage representing distance from said nozzle to said contoured surfaces.

11. The system of claim 10 wherein said rotating nozzle is a closed-end tube having said slit orifice in its side wall.

12. The system of claim 11 wherein said first-mentioned means to transmit rotation and air to said nozzle is a flexible bellows.

13. The system of claim 10 wherein said machine tool has a rotatable turret on which said tool holder is mounted, and said motor means comprises an aiming motor secured to said turret.

14. The system of claim 13 wherein said gage means comprises an automatic control for said aiming motor that minimizes said output voltage and sensed distance.

* * * * *